United States Patent
Kümmel et al.

(10) Patent No.: US 11,691,171 B2
(45) Date of Patent: Jul. 4, 2023

(54) SYSTEM AND DEVICE FOR A LACQUER TRANSFER

(71) Applicant: Airbus Operations GmbH, Hamburg (DE)

(72) Inventors: Waldemar Kümmel, Hamburg (DE); Daniel Kress, Hamburg (DE); Christian Schepp, Hamburg (DE); Alexander Gillessen, Hamburg (DE); Pierre Zahlen, Hamburg (DE); Sebastian Kerger, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 177 days.

(21) Appl. No.: 17/272,842

(22) PCT Filed: Aug. 26, 2019

(86) PCT No.: PCT/EP2019/072659
§ 371 (c)(1),
(2) Date: Mar. 2, 2021

(87) PCT Pub. No.: WO2020/048801
PCT Pub. Date: Mar. 12, 2020

(65) Prior Publication Data
US 2021/0268535 A1    Sep. 2, 2021

(30) Foreign Application Priority Data

Sep. 3, 2018  (DE) .................... 10 2018 121 422.7
Sep. 17, 2018 (DE) .................... 10 2018 122 747.7

(51) Int. Cl.
*B05C 1/08* (2006.01)
*B05C 1/02* (2006.01)
*B64F 5/00* (2017.01)

(52) U.S. Cl.
CPC ............ *B05C 1/0813* (2013.01); *B05C 1/027* (2013.01); *B05C 1/0808* (2013.01); *B64F 5/00* (2013.01)

(58) Field of Classification Search
CPC ..... B05C 1/0813; B05C 1/027; B05C 1/0808; B05C 1/08; B05C 1/0878; B05C 5/0254; B64F 5/00
(Continued)

(56) References Cited

U.S. PATENT DOCUMENTS

2017/0095831 A1    4/2017   Sturm et al.

FOREIGN PATENT DOCUMENTS

EP      1 034 905        9/2000
EP      1034905    *     9/2000
(Continued)

OTHER PUBLICATIONS

International Search Report for PCT/EP2019/072659, dated Nov. 5, 2019, 3 pages.
(Continued)

*Primary Examiner* — Laura Edwards
(74) *Attorney, Agent, or Firm* — Nixon & Vanderhye P.C.

(57) ABSTRACT

A device is disclosed including a frame, a transfer roller with a circumferential lateral wall, a drive unit, a slit nozzle with a muzzle end for dispensing lacquer, and a deformation unit. The slit nozzle and the deformation unit are each connected to the frame, and an outside contact surface of the lateral wall includes several depressions, the transfer roller is mounted rotatably about an axis of rotation at the frame. The drive unit is configured to drive the transfer roller in a rotation direction of the transfer roller, such that the lateral wall continuously passes through a first angular range and the second angular range, each fixed to the frame. The deformation unit is arranged to elastically deform the lateral
(Continued)

wall resulting in a respective first deformation section of the lateral wall passing through the first angular range and a respective second deformation section of the lateral wall passing through the second angular range.

18 Claims, 5 Drawing Sheets

(58) Field of Classification Search
USPC .................................................. 118/623, 110
See application file for complete search history.

(56) References Cited

FOREIGN PATENT DOCUMENTS

| KR | 2001-0093377 | | 10/2001 |
|---|---|---|---|
| WO | 2015/155128 | | 10/2015 |
| WO | WO2015/177943 | * | 11/2015 |

OTHER PUBLICATIONS

Written Opinion of the ISA for PCT/EP2019/072659, dated Nov. 5, 2019, 6 pages.

* cited by examiner

SYSTEM AND DEVICE FOR A LACQUER TRANSFER

CROSS REFERENCE TO RELATED APPLICATIONS

The present application is a National Phase of International Application Number PCT/EP2019/072659 filed Aug. 26, 2019, which designated the U.S. and claims priority benefits from German Patent Application Number DE 10 2018 121 422.7 filed Sep. 3, 2018, and German Patent Application Number DE 10 2018 122 747.7 filed Sep. 17, 2018 the entire contents of each of which are hereby incorporated by reference.

The invention relates to a device for a lacquer transfer.

A device for a lacquer transfer is known from the publication WO 2015/155 128 A1. This publication discloses a device which is configured for transferring lacquer to a substrate surface. This device is called as an applicator. The device comprises a frame, a transfer roller with a circumferential lateral wall and a drive unit. The outside contact surface of the lateral wall comprises several depressions. Furthermore, the applicator has its own drive for a circumferential movement of the transfer roller. The transfer roller is mounted rotatably about an axis of rotation at the frame. The device can be connected to a robot arm and moved via the robot arm in parallel to the substrate surface, such that the transfer roller roles with its contact surface on a substrate surface for transferring lacquer from the depressions in the lateral wall of the transfer roller to the substrate surface. Before the contact surface of the circumferential lateral wall of the transfer roller comes into contact with the substrate surface, the depressions of the lateral wall have to be filled with the lacquer, such that the lacquer can be transferred subsequently to the substrate surface while the transfer rollers roles on this substrate surface.

When transferring lacquer via the device to a surface of a substrate, an object is to transfer a desired or predetermined amount of a lacquer to the work surface. Therefore, the depressions of the lateral wall of the transfer roller have to be previously filled with the respective amount of lacquer. For filling the depression with lacquer, a lacquer supply unit has to be ranged close to the lateral wall.

During an inspection of the use of a device as known form the prior art, it has been found that the depressions can be filled with lacquer, if the lacquer supply unit is as closed as possible arranged to the circumferential lateral wall of the transfer roller. However, it has also been found that the radius of the circumferential lateral wall is in practice often not evenly constant about the circumference of the transfer roller. Instead, it is not unusual that the radius of the circumferential lateral wall varies over the circumference of the transfer roller. During rotation of the transfer roller, a radial distance between the lacquer supply unit and the circumferential lateral wall may also vary. Depending on the variance of this radial distance, the depressions may be fully filed with lacquer or just partly. It may also occur that the lacquer supply unit hits the circumferential lateral wall while the transfer roller rotates, if a section of the circumferential lateral wall has a larger radius than the remaining lateral wall. This may cause a temporary interruption of the rotation of the transfer roller. This is also referred to as a slip-stick-effect. The slip-stick-effect has a negative impact for the dispensing of the lacquer into the depressions and/or onto the outside surface of the lateral wall of the transfer roller. Therefore, the slip-stick-effect between the slit nozzle and the transfer roller is to be prevented.

An object of the present invention is to provide a device which is configured for transferring a lacquer via a transfer roller to a work surface of a work piece, such that a slip-stick-effect between the transfer roller rolling on the work surface and a lacquer supply unit is prevented.

The object is solved by a device comprising the features of claim 1. Therefore, the invention relates to a device for a lacquer transfer. The device comprises a frame, a transfer roller with a circumferential lateral wall, a drive unit, a slit nozzle with a muzzle end for dispensing a lacquer, and a deformation unit. The slit nozzle and the deformation unit are each at least indirectly connected to the frame. An outside contact surface of the lateral wall comprises several depressions. The transfer roller is mounted rotatably about an axis of rotation at the frame. The drive unit is configured to drive the transfer roller in a rotation direction of the transfer roller, such that the lateral wall continuously passes through a first angular range fixed to the frame around the axis of rotation and subsequently through a second angular range fixed to the frame around the axis of rotation. The lateral wall of the transfer roller is elastically deformable in a radial direction of the transfer roller. The deformation unit is configured to deform the lateral wall in the radial direction of a transfer roller. The deformation unit is arranged, such that the deformation unit elastically deforms the lateral wall resulting in a respective first deformation section of the lateral wall passing through the first angular range and a respective second deformation section of the lateral wall passing through the second angular range. The muzzle end of the slit nozzle is arranged contactless to or in direct contact with the outside surface at the second deformation section of the lateral wall for dispensing lacquer into respective depressions. The transfer roller is configured to roll with the contact surface on a work surface of a work piece for transferring the lacquer from the depressions to the work surface of the work piece.

Preferably, the device or at least its frame is configured to be releasably connected to a handling device, such as a robot with a robot arm. The frame may be configured to be releasably connected to the robot arm. Thus, the device may be a mobile device, in particular a mobile mechanical device.

The frame may form the bases of the device, since the slit nozzle and the deformation unit are each at least indirectly connected to the frame. For this purpose, the device may comprise further connecting means for connecting the slit nozzle to the frame and/or further connecting means for connecting the deformation unit to the frame. Thus, the slit nozzle and the deformation unit may be mounted to the frame. The slit nozzle may be releasably connected to the frame. Thus, the slit nozzle may be disconnected form the frame, in particular for a maintenance purpose. The slit nozzle may be connected to the frame, such that the slit nozzle can be releasably locked in a working position. If this lock is released, the slit nozzle may be pivoted via a hinge, which holds the slit nozzle at the frame. Thus, the slit nozzle may then be subject to a maintenance procedure.

The transfer roller is mounted rotatably to the frame. The transfer roller can therefore rotate about the axis of rotation. For this purpose, the device comprises the drive unit, which is configured to drive the transfer roller in a rotation direction of the transfer roller about the axis of rotation. The drive unit may also be at least indirectly connected or mounted to the frame. During use, the drive unit drives the transfer roller, such that the transfer roller rotates about the axis of rotation and roles with the contact surface on a work surface. Furthermore, the device is moved translational in parallel to the work surface, preferably by a robot arm or another handling device, while the transfer roller rotates, such that the transfer roller rolls on the work surface for transferring lacquer.

The slit nozzle may be connected via a pipe or a tube to a lacquer supply unit, which may be configured to supply the lacquer via the tube or the pipe to the slit nozzle. The lacquer may be a self-hardening lacquer or a lacquer, which can be hardened via UV-light. The lacquer supplied to the slit nozzle may be a liquid medium or a viscous medium.

According a first nozzle arrangement of the slit nozzle, the muzzle end of the slit nozzle may be arranged contactless to the outside contact surface at the second deformation section of the lateral wall for dispensing lacquer into respective depressions.

According a second nozzle arrangement of the slit nozzle, the muzzle end of the slit nozzle is arranged in direct contact with the outside contact surface at the second deformation section of the lateral wall for dispensing lacquer into respective depressions.

If reference is subsequently made to the slit nozzle without explicitly specifying the first or second nozzle arrangement, the corresponding explanations may, in principle, apply as preferred embodiments to each of the two arrangements. Therefore, it may be possible to apply the respective explanations to one of the first and second nozzle arrangement or to both nozzle arrangements.

The slit nozzle is configured for dispensing lacquer into the depressions of the lateral wall of the transfer roller. The slit nozzle may also be configured for dispensing lacquer onto depression-free sections of the lateral wall of the transfer roller. Thus, the slit nozzle may be configured for dispensing a lacquer film onto the lateral wall of the transfer roller, wherein the lacquer of the lacquer film fills the depressions and the lacquer film extends in axial direction and partly in circumferential direction of the transfer roller. The lacquer film may therefore theoretically divide into a depression part, which fills the depressions, and a remaining part, which is also referred to as bulk or a bulk part. Therefore, the transfer roller may be configured to roll with the contact surface of the transfer roller on a work surface of a work piece for transferring the lacquer from the contact surface to the work surface of the work piece, such that the lacquer film is transferred to the work surface. This encompassed the transfer of the lacquer from the depressions, but also the transfer of the bulk part. If the transfer of the lacquer from the depression to the work surface, in particular to a surface of a wing, is described in the following, this shall preferable not exclude the possible transfer of the bulk part to the respective surface and/or the possible transfer of the lacquer from the depressions via the lacquer film.

Resulting from the direct contact between the muzzle end of the slit nozzle and the outside surface of the lateral wall of the transfer roller, preferably if the slit nozzle is in the first nozzle arrangement, a desired fill level of the depressions may be ensured and/or a desired mean thickness of the lacquer film may be ensured. However, a resulting contact force and/or a resulting contact friction should not change as much as possible during a rotation of the transfer roller in order to prevent the slip-stick-effect as described in the introduction.

But a desired fill level of the depression may also be ensured and/or a desired mean thickness of the lacquer film on the outside surface of the lateral wall may be ensured, if the muzzle end of the slit nozzle is arranged contactless to the outside contact surface at the second deformation section of the lateral wall, in particular, if the slit nozzle is arranged according to the second nozzle arrangement. A distance formed by the gap between the slit nozzle and the outside contact surface at the second deformation section may be predefined by an arrangement of the slit nozzle according to the second nozzle arrangement, such that lacquer dispensed by the slit nozzle continuously forms the lacquer film on the on the outside surface of the lateral wall, preferably with a predefined thickness. The dispensed lacquer therefore fills the aforementioned gap with the lacquer. As an effect, lacquer also fills the depressions of the outside contact surface at the second deformation section of the lateral wall. As a further effect, a bulk part may also be applied to the outside contact surface at the second deformation section of the lateral wall.

When the transfer roller is driven by the drive unit in a rotation direction, the lateral wall of the transfer roller continuously passes (in the rotation direction) through a first angular range fixed to the frame and subsequently through a second angular range fixed to the frame. Thus, both angular ranges are fixed to the frame. Preferably, the second angular range follows directly to the first angular range in the rotation direction of the transfer roller. Each of the first and second angular range may have a triangular shape. The first angular range preferably reaches in radial direction from a respective tip at the axis of rotation of the transfer roller. The second angular range may also reach in radial direction from a respective tip at the axis of rotation. Thus, the second angular range can follow directly to the first angular range in rotation direction. Moreover, the first and second angular ranges are preferably stationary with the frame.

The lateral wall of the transfer roller is preferably made of elastomer plastic, such that it can be elastically deformed in a radial direction of the transfer roller. The deformation unit is arranged and/or mounted to the frame, such that the deformation unit elastically deforms the lateral wall in radial direction. The deformation of the lateral wall is divided in accordance with the first and second angular range into the first and second deformation section (of the lateral wall).

Therefore, the deformation unit is arranged, such that the lateral wall is elastically deformed in the first deformation section of the lateral wall, which is currently being passed through the first angular range. Since the lateral wall continuously passes through the first angular range, a continuous change of a part of the lateral wall forming the first deformation section occurs. Preferably, the deformation unit is arranged outside of the lateral wall within the first angular range, such that the deformation unit elastically deforms the lateral wall resulting in the respective first deformation section of the lateral wall.

As the elastic deformation of the lateral wall does not change abruptly, the elastic deformation of the lateral wall also results in a second deformation section of the lateral wall passing through the second angular range. Therefore, the deformation unit is also arranged, such that the lateral wall is elastically deformed in the second deformation section of the lateral wall, which is currently being passed through the second angular range. Since the second angular range is preferably located in rotation direction of the transfer roller behind the first angular range, the second deformation section is preferably directly located behind the first deformation section in the rotation direction of the transfer roller.

In particular while the transfer roller rotates about the axis of rotation, the muzzle end of the slit nozzle is arranged in direct contact with the second deformation section of the lateral wall or the slit nozzle is arranged contactless to the second deformation section of the lateral wall. The second deformation section results from the elastic deformation of the lateral wall caused by the deformation unit, which is fixed with the frame. Therefore, the second deformation section may represent a transition section between the first deformation section and an undeformed section of the lateral wall. This undeformed section of the lateral wall may be arranged between the second deformation section and a further, third section of the lateral wall, which is located to come into direct contact with the work surface of the workpiece.

In contrast to the often not constant radius of the undeformed section of the lateral wall, the second deformation section preferably has an at least substantially predefined orientation and/or at least substantially predefined course of the respective radius in the rotation direction. A contact angle and/or a contact force and/or a contact friction between the muzzle end of the slit nozzle and the second deformation section of the lateral wall of the transfer roller is therefore only subject to a very low variance. This prevents a friction between the transfer roller and the muzzle end of the slit nozzle from unforeseen and/or undesired change between sliding friction and adhesion. Instead, a sliding friction can be ensured. As a result, the previously discussed slip-stick-effect can be prevented.

According to a preferred embodiment of the device, if the muzzle end of slit nozzle is in direct contact with the outside contact surface at the second deformation section of the lateral wall, the slit nozzle is arranged such that the lateral wall is deformed by the slit nozzle by less than 15 mm in radial direction. Generally, the slit nozzle may be in contact with the outside contact surface without forcing the second deformation section of the lateral wall in radial direction. But this may be just a particular example. If the slit nozzle deforms the lateral wall in radial direction, the second deformation section may be subject to a respective further deformation provided not only by the deformation unit, but also by slit nozzle. However, a force applied by the slit nozzle in radial direction to the lateral wall may be limited, in particular such that the deformation is less than 15 mm, in particular less than 10 mm or less than 5 mm, in radial direction.

According to a preferred embodiment of the device, the slit nozzle comprises a first nozzle part and a second nozzle part, wherein the first nozzle part protrudes beyond the second nozzle part, such that the first nozzle part is in direct contact with the outside contact surface at the second deformation section of the lateral wall and such that the second nozzle part is spaced apart from this outside contact surface. By the slit nozzle preferably having two parts, a contact pressure of the first nozzle part on the outside contact surface and/or the resulting deformation can be precisely adjusted by means of the first nozzle part. The second nozzle part can be formed and/or arranged such that a precise application of the lacquer is ensured.

According to a preferred embodiment of the device, if the muzzle end of the slit nozzle is arranged contactless to the outside contact surface at the second deformation section of the lateral wall, the slit nozzle is arranged such that a first minimum distance between the muzzle end facing the outside contact surface at the second deformation section of the lateral wall and this outside contact surface is less than 15 mm, in particular between 0.01 mm and 10 mm. The first minimum distance is preferably the distance in the radial direction between the outer contact surface and a section of the nozzle which is closest to the outer surface. This section may be formed by the first part of the slit nozzle. As a result, both, the first and second nozzle part may be spaced apart from the outside contact surface of the lateral wall.

However, the slit nozzle may also be formed in an embodiment different from the aforementioned embodiment. For instance, the slit nozzle may be formed by more than two part or just as a single part. The particular small distance according to the first minimum distance ensures a particularly precise and evenly distributed application of the lacquer. At the same time a direct mechanical contact between the outside contact surface and the muzzle end of the slit nozzle is avoided, which prevents wear of the lateral wall of the transfer roller and the slit nozzle.

According to a preferred embodiment of the device, the slit nozzle comprises a first nozzle part and a second nozzle part, wherein the first nozzle part protrudes beyond the second nozzle part in a direction towards the outside contact surface at the second deformation section of the lateral wall. This embodiment can be applied to both, the first nozzle arrangement and/or the second nozzle arrangement.

In case the first nozzle part is in direct contact with the lateral wall, the contact pressure of the first nozzle part on the outside contact surface and/or the resulting deformation can still be precisely adjusted by means of the first nozzle part.

Independent whether the first nozzle part contacts or does not contact the lateral wall, the first nozzle part may also protrude beyond the second nozzle part, such that the second nozzle part is set back in relation to the first nozzle part from the outside contact surface. As a result, an output channel end for dispensing the lacquer may be defined. Therefore, a film thickness of the lacquer to be applied on the outside contact surface can be precisely adjusted by means of the second nozzle part. This may be ensured, if the second nozzle part is arranged behind the first nozzle part in the circumferential direction of the transfer roller.

The resulting distance between the second nozzle part and the outside contact surface forms a thickness of this output channel end and can therefore at least influence the thickness of the applied lacquer. If the second nozzle part is displaceable and/or adjustable with respect to the first nozzle part, this may be used to define the thickness of the lacquer film. This may be independent of the contact force and/or deformation resulting from the contact between the first nozzle part and the outside contact surface, if the first nozzle part is in contact with the outside surface of the lateral wall.

According to a preferred embodiment of the device, the second nozzle part is spaced apart from the outside contact surface by a second minimum distance between 0.01 mm and 5 mm, in particular between 1 mm and 3 mm or between 0.05 mm and 0.3 mm. This allows to precisely adjust the thickness of the lacquer to be applied to the outside contact surface of the transfer roller, in particular in the range between 0.01 mm and 5 mm, for instance between 1 mm and 3 mm.

According to a preferred embodiment of the device, the transfer roller is an inflated transfer roller. Thus, the transfer roller may form a gastight interior space, which is at least partly limited by the circumferential lateral wall. The interior space may have the form of a torus. The transfer roller may be inflated, such that air or gas in the interior space has a predefined pressure or a controlled pressure. The lateral wall of the transfer roller is elastically deformable in radial direction. This may be allowed by the inflated transfer roller, since the lateral wall can be deformed against the pressure of the air/gas in the interior space. This pressure also allows or ensures the first and second deformation section. In particular, the second deformation can be a transition section between the first deformation section and the undeformed remaining section of the lateral wall of the transfer roller. The inner pressure may act on an inner surface of the lateral wall, such that the deformation caused by the deformation unit is reversed within the second deformation section.

According to a preferred embodiment of the device, the lateral wall is deformed by deformation unit between 0.5 millimeter and 30 millimeter in radial direction of the transfer roller. The lower limit of 0.5 millimeter may ensure that a possible variance of the radius of the lateral wall of the transfer roller does not have an substantial effect on the preferably predefined orientation and/or preferably predefined course of a radius of the second deformation section. The upper limit of 30 millimeter may ensure that the deformation of the lateral wall is limited, in particular such that deformation of the lateral wall remains elastic. This allows a long lifetime of the transfer roller.

According to a preferred embodiment of the device, the first deformation section has a first mean deformation in radial direction of 0.3% to 15% of a mean radius of the lateral wall of the transfer roller. As a result, the first mean deformation has predefined limits, wherein the first mean deformation is at least larger than zero, namely at least 0.3% of the mean radius of the lateral wall of the transfer roller. This ensures that the deformation in the first deformation section is caused by the deformation unit. The upper limit of 15% may ensure that the deformation of the lateral wall is limited, in particular such that deformation of the lateral wall remains elastic. This allows a long lifetime of the transfer roller.

According to a preferred embodiment of the device, the second deformation section has a second mean deformation in radial direction between 30% and 80% of the first mean deformation. This can ensure that the second mean deformation is smaller than the first mean deformation. As an effect, the second deformation section may be a transmission section of the lateral wall between the first deformation section and the undeformed section of the lateral wall of the transfer roller, wherein the undeformed section may follow the second deformation section in the circumferential direction of the transfer roller. The undeformed section of the lateral wall may also be referred to as the "normal" section of the lateral wall.

According to a preferred embodiment of the device, the deformation unit is arranged in the first angular range. The first deformation section of the lateral wall is passed through the first angular range. Preferably, the first deformation section has a larger deformation than the second deformation section. Moreover, the first deformation section preferably forms or should form the largest elastic deformation section of the lateral wall. Arranging the deformation unit in the first angular range has the advantage that the deformation unit can directly cause the first deformation section, in particular with a first mean deformation.

According to a preferred embodiment of the device, the deformation unit is arranged, such that the deformation unit elastically deforms the first deformation section of the lateral wall, such that the first mean deformation or the second mean deformation is caused by the deformation unit. If the second mean deformation of the second deformation section is deterministically caused by the deformation unit, this may allow—according to a preferred embodiment—to exactly arrange the muzzle end of the slit nozzle in direct contact with the outside contact surface at the second deformation section, such that a predefined contact, in particular a predefined contact force and/or predefined contact friction, can be ensured between the muzzle end of the slit nozzle and the lateral wall of the transfer roller. According to a further embodiment, if the second mean deformation of the second deformation section is deterministically caused by the deformation unit, this may also allow to exactly arrange the muzzle end of the slit nozzle contactless to the outside contact surface at the second deformation section, such that a predefined fluid friction resulting from the lacquer dispensed by the slit nozzle can ensured between the muzzle end of the slit nozzle and the lateral wall of the transfer roller.

It is to be noted that the first mean deformation of the first deformation section can be deterministically caused by the arrangement of the deformation unit. The second mean deformation may be in functional relation with the first mean deformation. Arranging the deformation unit, such that the deformation unit elastically deforms the lateral wall resulting in a predefined first mean deformation of the first deformation section of the lateral wall may therefore at least indirectly result in a corresponding predefined second mean deformation of the second deformation section of the lateral wall. As explained above, this allows to exactly arranging the muzzle end of the slit nozzle with respect to the second deformation section without causing a slip-stick-effect.

According to a preferred embodiment of the device, the deformation unit is arranged outside the transfer roller. This allows a simple adjustment of the arrangement of the transfer roller with respect to the lateral wall of the transfer roller. Moreover, if the transfer roller is configured as an inflated transfer roller, the complexity remains low, if the deformation unit is arranged outside the transfer roller.

According to a preferred embodiment of the device, the deformation unit is arranged inside an interior space formed by the transfer roller. This embodiment may be of advantage, if a compact device is to be provided.

According to a preferred embodiment of the device, the deformation unit comprises a pressure roller, which presses rollably on the lateral wall resulting in a deformation of the lateral wall in a radial direction, in particular in a positive or negative radial direction. For instance, if the deformation unit is arranged outside the transfer roller, this allows the pressure roller to press rollably on an outside surface, in particular the on contact surface of the lateral wall resulting in a deformation of the lateral wall in a (negative) radial direction. The pressure roller has the positive effect of not causing a too high roll friction between the pressure roller and the lateral wall of the transfer roller. It is to be noted that the deformation unit with its pressure roller can also be arranged within the interior space formed by the transfer roller in another embodiment. In this case, the pressure roller can press rollably on an inner surface of the lateral wall resulting in a deformation of the lateral in a (positive) radial direction.

According to a preferred embodiment of the device, the deformation unit comprises a vacuum unit configured to generate negative pressure acting contactless on the lateral wall resulting in a deformation of the lateral wall in radial direction, in particular in positive or negative radial direction. For instance, the deformation unit with its vacuum unit can be arranged in the interior space of the transfer roller, such that the vacuum generated by the vacuum unit acts contactless on the inner surface of the lateral wall resulting in the deformation of the lateral wall in a (negative) radial direction. But the deformation unit with the vacuum unit can also be arranged outside of the transfer roller, such that the vacuum, generated by the vacuum unit, acts contactless on the outside surface of the lateral wall resulting in a deformation of the lateral wall in a (positive) radial direction.

Using a vacuum unit for the deformation unit has the advantage that a particular low friction is caused between the lateral wall and the deformation unit during the deformation. This effectively helps preventing a slip-stick-effect as described in the introduction.

According to a preferred embodiment of the device, the deformation unit comprises a gas pressure unit configured to generate a positive gas pressure acting contactless on the lateral wall resulting in a deformation of the lateral wall in radial direction, in particular in positive or negative radial direction. Thus, the deformation unit with the gas pressure unit can be arranged outside the lateral wall, such that the gas pressure, which is generated by the gas pressure unit, acts contactless on the outside surface of the lateral wall resulting in a deformation in a (negative) radial direction of the lateral wall. The opposite occurs, if the deformation unit with the gas pressure unit is arranged within the interior space of the transfer roller. In this case, the gas pressure generated by the gas pressure unit acts on the inside surface of the lateral wall resulting in a deformation of the lateral wall in a (positive) radial direction. The gas pressure unit of the deformation unit has the positive effect that a friction between the deformation unit and the lateral wall can be as small as possible. This helps to prevent a slip-stick-effect as discussed in the introduction.

According to a preferred embodiment of the device, ferromagnetic metal particles are embedded in the lateral wall, in particular in the elastomer material of the lateral wall. The deformation unit preferably comprises a magnet, in particular a controllable electro-magnet, causing a magnetic force on the metal particles resulting in a deformation of the lateral wall in radial direction, in particular in positive or negative radial direction. For instance, the ferromagnetic metal particles are disputed evenly in circumferential direction of the lateral wall of the transfer roller. Moreover, the magnet of the deformation unit is preferably controllable electro-magnet. The electro-magnet can be controlled such that the magnetic force acting on the metal particles embedded in the lateral wall is also controlled. According to a preferred embodiment, the deformation unit with the electro-magnet is arranged outside the lateral wall or inside the interior of the transfer roller.

According to a preferred embodiment of the device, the slit nozzle of faces in a nozzle direction with its muzzle end, such that the nozzle direction forms an acute angle between 40 degree and 85 degree with a straight line extending from a center of the first deformation section to the muzzle end. This ensures that the muzzle end of the slit nozzle is outwardly offset with the center of the first deformation section. As an effect, a friction force and/or a friction between the muzzle end and the outside contact surface of the lateral wall of the transfer roller can be limited, preferably to a predefined level.

According to a preferred embodiment of the device, the slit nozzle faces in a nozzle direction with its muzzle end, such that the nozzle direction forms an right angle with a straight line extending from a center of the first deformation section to the muzzle end. Therefore, the slit nozzle may be arranged perpendicular with the second deformation section of the lateral wall of the transfer roller.

According to a preferred embodiment of the device, the slit nozzle is arranged in an angle about the axis of rotation of the transfer roller between 10 degree and 120 degree with respect to a contact point of the transfer roller, where the transfer roller comes into contact with the work surface. This limits a travel distance for the lacquer from the slit nozzle to the transfer of the lacquer to the work surface.

According to a preferred embodiment, the first angular range and the second angular range are each of the same size, in particular of the same angle size. This allows to simply dividing the deformed part of the lateral wall, caused by the deformation unit, to be evenly arranged in the first and second angular range.

According to a preferred embodiment of the device, the first angular range forms a first acute angle between 5 degree and 40 degree at a tip end of the first angular range facing the axis of rotation the transfer roller. As a result, the first angular range is limited in its angle span. This allows to precisely defined the first deformation section and in particular the arrangement of the deformation unit.

Further features, advantages and application possibilities of the present invention may be derived from the following description of exemplary embodiments and/or the figures. Thereby, all described and/or visually depicted features for themselves and/or in any combination may form an advantageous subject matter and/or features of the present invention independent of their combination in the individual claims or their dependencies. Furthermore, in the figures, same reference signs may indicate same or similar objects.

Figure 1:
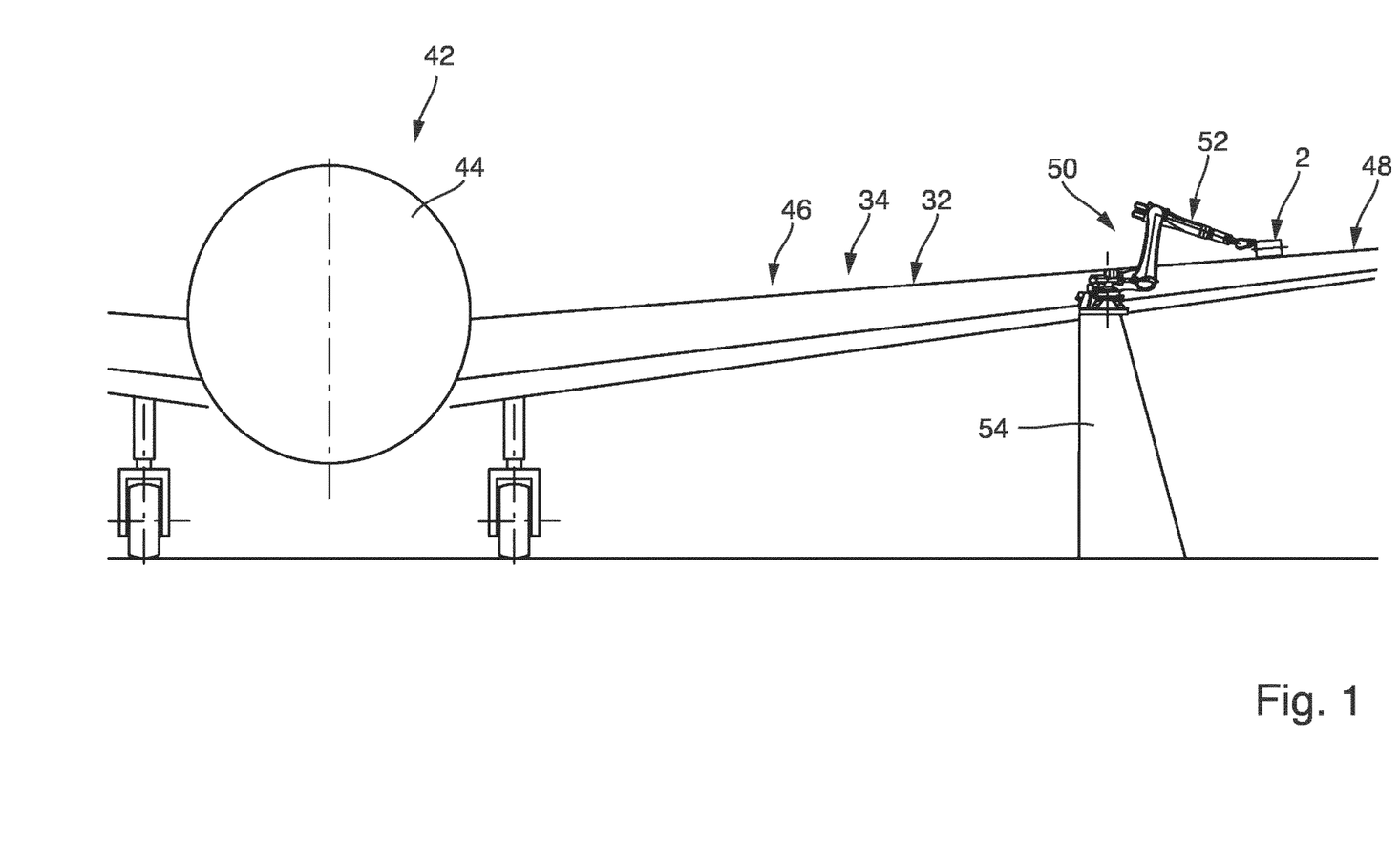
FIG. 1 schematically illustrates a part of an aircraft wherein a device arranged for transferring lacquer on an upper wing surface.

FIG. 1 schematically illustrates an aircraft 42, which comprises a fuselage 44 and a wing 46. The air resistance of the aircraft 42 can be reduced, if the upper wing surface 48 of the wing 46 comprises a profile structure. It has been found of advantage, if this profile structure is a microstructure.

FIG. 1 also schematically shows a robot 50, which is seated on a rack 54. The robot 50 comprises a movable robot arm 52. A device 2 is mounted at an end of the robot arm 52, such that the device 2 can be moved by the robot 50.

The device 2 is configured for transferring a lacquer onto a work surface 32 of a workpiece 34. According to the example shown in FIG. 1, the workpiece 34 can be formed by the wing 46 of the aircraft 42. Thus, the upper wing surface 48 can form the work surface 32.

Figure 2:
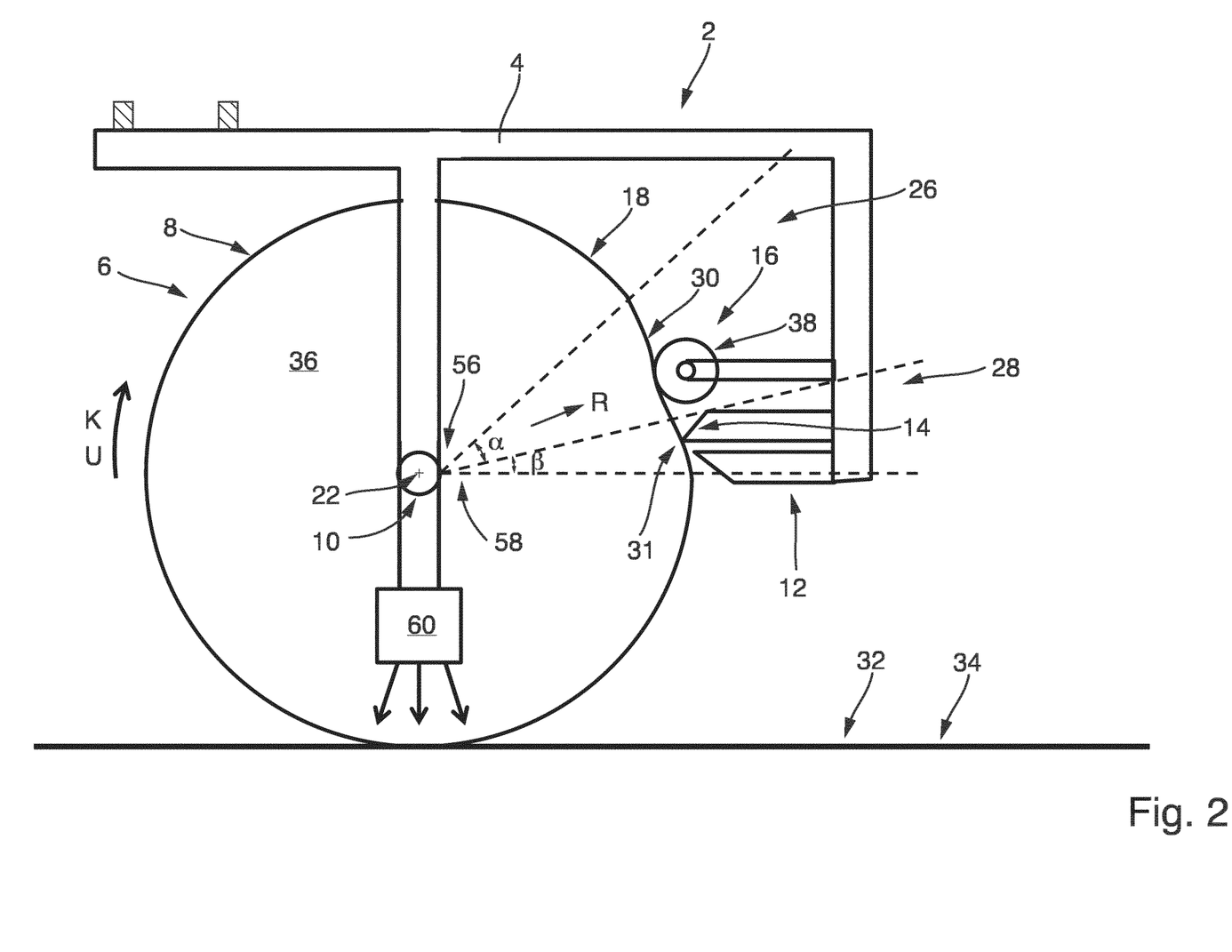
FIG. 2 schematically illustrates a first embodiment of the device in a cross-sectional view.

A first embodiment of the device 2 is schematically illustrated in FIG. 2 in a cross-sectional view. The device 2 comprises a frame 4, a transfer roller 6 with a circumferential lateral wall 8, a drive unit 10, a slit nozzle 12 with a muzzle end 14 for dispensing lacquer, and a deformation unit 16. The transfer roller 6 may also be referred to as a transfer tire. The device 2 can be attached via the frame 4 to the robot arm 52. However, instead of a robot 50 any other handling device may also be used, which is configured to move the device 2 in space. The frame 4 may be adapted to be releasably connected to a handling device, such as the robot 50.

The transfer roller 6 is mounted rotatably, in particular by means of at least one bearing, about an axis of rotation 22 at the frame 4. An outside contact surface 8 of the lateral wall 6 comprises several depressions 20. The depressions 20 may be evenly or stochastically distributed about the circumference of the lateral wall 6. The FIGS. 3 and 4 show a part of the transfer roller 6 in a cross-section view and a top view, respectively.

Figure 3:
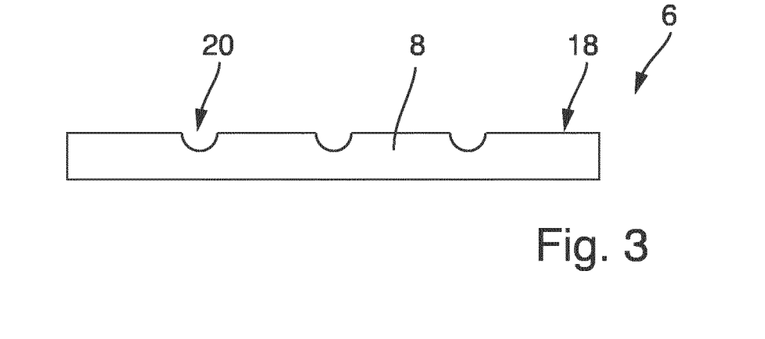
FIG. 3 schematically illustrates a part of the lateral wall of the transfer roller in a cross-sectional view.

As schematically indicated in FIG. 3, the depressions 20 can be formed by recesses arranged at the outside surface 18 of the lateral wall 8 of the transfer roller 6. The depressions 20 can have a predefined size and/or structure. A mean structure size of the depressions 20 can be in the range of 0.1 micrometer to 100 micrometer. In other words, each of the depressions 20 may have a microstructure.

Figure 4:
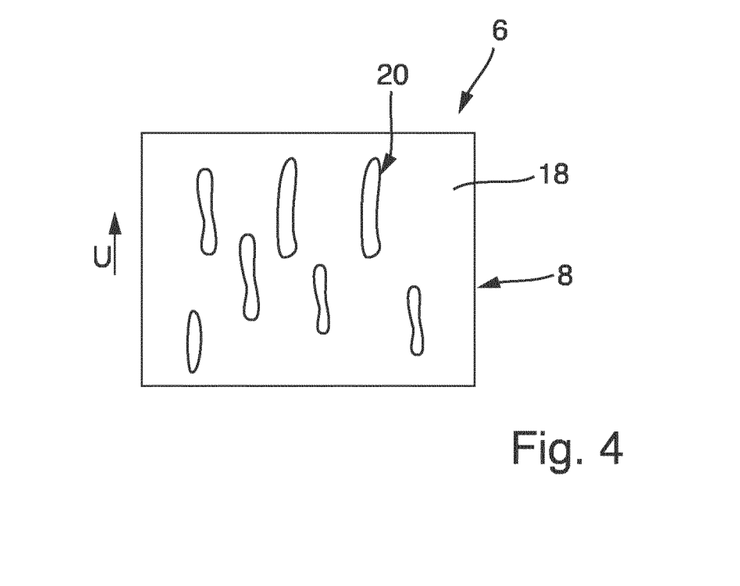
FIG. 4 schematically illustrates a further embodiment of the lateral wall of the transfer roller in a top view.

FIG. 4 exemplarily shows the depressions 20 of a part of the lateral wall 8 of the transfer roller 6 in a top view. Each of the depressions 20 may comprise an elongated extension in a circumferential direction U of the lateral wall 8 of the lateral wall 8 of the transfer roller 6.

Each of the depressions 20 is configured to receive lacquer and to transfer this received lacquer to a work surface 32 of a work piece 34, such as the upper wing surface 48 of a wing 26. Therefore, the several depressions 20 at the outside contact surface 18 of the lateral wall 8 may be arranged and/or formed according to a predefined structure, in particular a microstructure. The lateral wall 8 is preferably made of silicone, such that a damage of the wing surface 48 can be prevented.

If the depressions 20 are filled with a lacquer and if the outside contact surface 18 comes into contact with the work surface 32, in particular the upper wing surface 48, the lacquer previously received in the depressions 20 is transferred to the work surface 32, in particular the upper outside surface 48 of the aircraft 42. This transferred lacquer has a structure, in particular microstructure, corresponding to a structure defined by depressions 20. Thus, the outside contact surface 18 with its depressions 20 is configured for embossing a lacquer-structure, in particular a lacquer-microstructure, on the work surface 32, in particular the upper wing surface 48.

As schematically illustrated in FIG. 2, the slit nozzle 12 is directly or indirectly connected to the frame 4. Thus, the slit nozzle 12 may be mounted to the frame 4. Furthermore, the deformation unit 16 is directly or indirectly connected to the frame 4. For instance, the deformation unit 16 may be mounted on the frame 4. According to an example not illustrated in FIG. 2, the slit nozzle 12 and the deformation unit 16 may be formed by an integrated unit. But the slit nozzle 12 may also be directly connected to the deformation unit 16, or vice versa. Thus, the slit nozzle 12 and the deformation unit 16 may be mounted in series to the frame 4.

The device 2 also comprises the drive unit 10. The drive unit 10 is configured to drive the transfer roller 6 in a rotation direction K of the transfer roller 6, such that the lateral wall 8 continuously passed in the rotation direction K through a first angular range 26 fixed to the frame 4 around the axis of rotation 22 and subsequently through a second angular range 28 fixed to the frame 4 around the axis of rotation 22. Each of the first and second angular ranges 26, 28 has a triangular shape. Each of its tips 56, 58 is arranged at the axis of rotation 22. The first and second angular ranges 26, 28 are schematically illustrated in FIG. 2 with the help of the dashed lines. The upper two lines intersect at the axis of rotation 22, such that a triangular range forming exemplarily the first angular range 26 is spanned by these two upper dashed lines. In total, three dashed lines are shown and intersect at the same axis of rotation 22. Thus, the dashed line arranged in the middle forms also a part of the lower two dashed lines, which span another range forming the second angular range 28. The orientation and/or arrangement of the first and second angular ranges 26, 28 is fixed with the frame 4. Preferably, the first angular range 26 forms a first acute angle α between 5 degree and 40 degree at the tip end 56 of the first angular range 26 facing the axis of rotation 22 of the transfer roller 6. The second angular range 28 may form a second acute angle β between 5 degree and 40 degree at a tip end 58 of the second angular range 28 facing the axis of rotation 22 of the transfer roller 6.

The lateral wall 8 of the transfer roller 6 is elastically deformable in a radial direction R of the transfer roller 6. The lateral wall 8 of the transfer roller 6 can be made of an elastomer plastic, a silicone or any other elastically deformable plastic material. Preferably, the lateral wall 8 of the transfer roller 6 is made of a synthetic, elastically deformable silicone. As a result, the lateral wall 8 can be at least section-wise deformed in positive or negative radial direction R. The deformation unit 16 is configured to deform the lateral wall 8 in the radial direction R of the transfer roller 6. If references made to the radial direction R, this may refer to the positive radial direction R or an opposite negative radial direction.

The deformation unit 16 is arranged, such that the deformation unit 16 elastically deforms the lateral wall 8 resulting in a respective first deformation section 30 of the lateral wall 8 passing through the first angular range 26 and a respective second deformation section 31 of the lateral wall 8 passing through the second angular range 28.

As schematically illustrated in FIG. 2, the deformation unit 16 may comprise a pressure roller 28, which is arranged outside of the transfer roller 8. Furthermore, the pressure roller 38 is arranged, such that the pressure roller 38 presses rotatably on the outside contact surface 18 of the lateral wall 8 resulting in a deformation of the lateral wall 8 in the first deformation section 30 and the second deformation section 31. The deformation is a deformation in radial direction R. As exemplarily shown in FIG. 2, the pressure roller 38 presses on the lateral wall 8, such that the first deformation section 30 is deformed in negative radial direction, such that the mean radius of the first deformation section 30 is less than a mean radius of the lateral wall 8. The second deformation section 31 also caused by the pressure roller 38 of the deformation unit 16 forms an intermediate section between the first deformation section 30 and the remaining, undeformed section of the lateral wall following the second deformation section 31 in the rotation direction K of the transfer roller 6. Therefore, the mean deformation of the second deformation section 31 is preferably less than the mean deformation of the first deformation section 30. But the mean radius of the second deformation section 31 is preferably still less than the mean radius of the lateral wall 8. As an further effect and basically resulting from its intermediate section character, the radius and/or orientation of the second deformation section 31 can be predefined by the arrangement of the deformation unit 16, in particular of its pressure roller 38. This radius and/or orientation of the second deformation section 31 is at least substantially defined by the deformation caused by the deformation unit 16. A possible variance of the radius of the lateral wall 8 of the transfer roller 6 may therefore have almost no or just a very small influence on the radius and/or orientation of the second deformation section 31 of the lateral wall 8.

According to a preferred embodiment exemplarily illustrated in FIGS. 1 and 2, the muzzle end 14 of the slit nozzle 12 is in direct contact with the outside contact surface 18 at the second deformation section 31 of the lateral wall 8 for dispensing lacquer from the muzzle end 14 into respective depressions 20. The depressions 20 of the lateral wall 8 arranged at the outside contact surface 18 at the second deformation section 31 are therefore filled with lacquer. The transfer roller 6 is driven by the drive unit 10, such that the lacquer is transported via the depressions 20 in rotation direction K such that the outside contact surface 18 with the depressions 20 filled with lacquer roles in direct contact about the work surface 32 for transferring the lacquer to the work surface 32.

Since the muzzle end 14 of the slit nozzle 12 is in direct contact with the outside contact surface 18 at the second deformation section 31, a predefined contact force and/or a predefined contact resistance between the muzzle end 14 of the slit nozzle 12 and the second deformation section 31 of the lateral wall 8 during the rotation of the lateral wall 8 can be ensured. This contact force and/or contact friction can be predefined such that a slip-stick-effect between the outside contact surface 18 of the lateral wall 8 and the slit nozzle 12 is prevented. This ensures, that the structure, in particular a microstructure, of the depressions 20 at the outside contact surface 18 embosses a predefined lacquer-structure on the work surface 32 of the work piece 34, wherein the predefined lacquer-structure corresponds to the structure of the depressions 20.

As schematically illustrated in FIG. 2, the deformation unit 16 is preferably arranged outside of the lateral wall 8 of the transfer roller 6. But the deformation unit 16 could also be arranged within an interior space 36 formed by the transfer roller 6.

Figure 5:
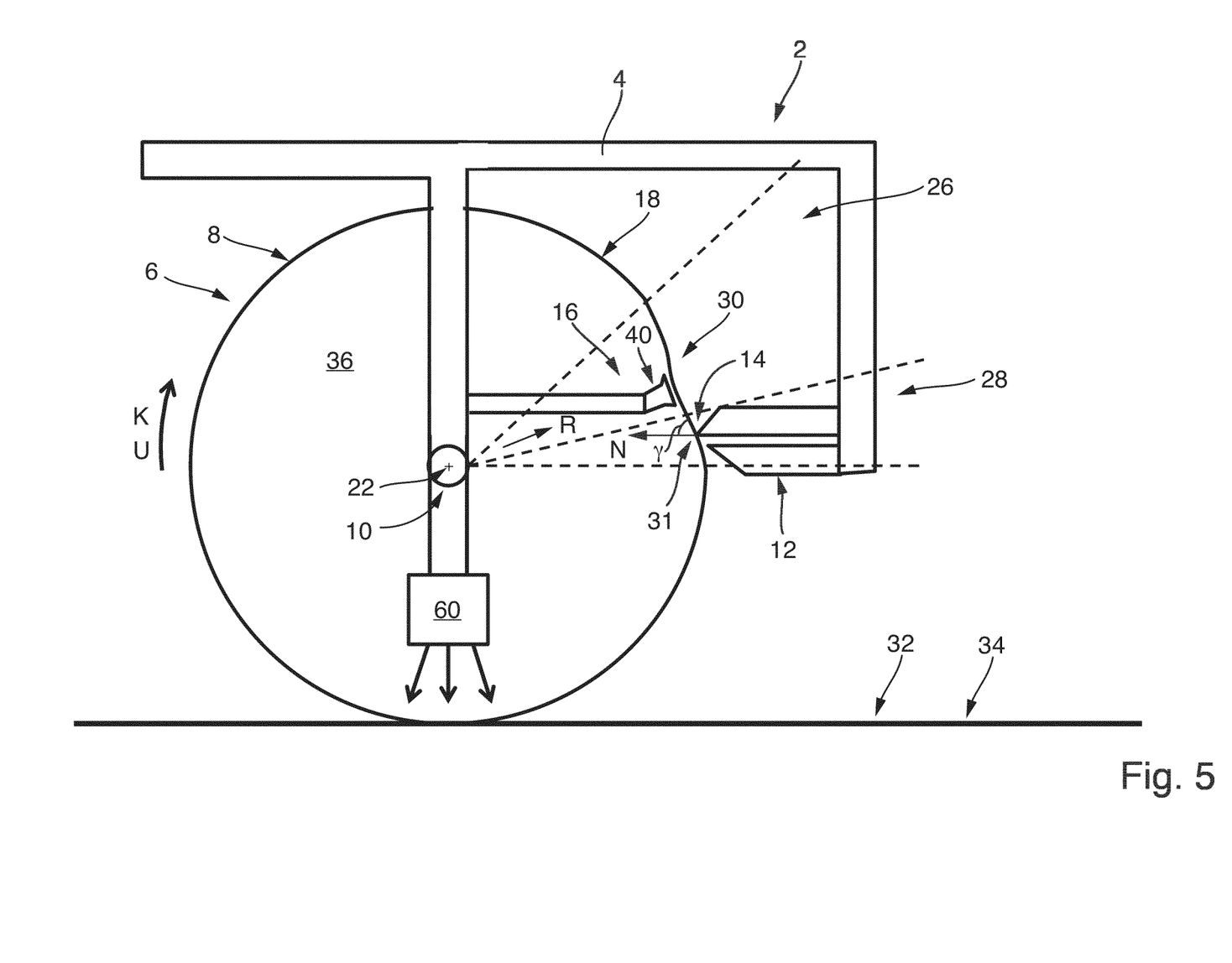
FIG. 5 schematically illustrates a second embodiment of the device in a cross-sectional view.

FIG. 5 shows a second embodiment of the device 2. Since most aspects and/or features of this device 2 correspond to the first embodiment of the device 2 discussed in conjunction with FIG. 2, reference to the previously provided explanations of the device 2 is made, at least in an analogous manner. However, the deformation unit 16 of the device 2 schematically illustrated in FIG. 5 is arranged within the interior space 36 formed by the transfer roller 6. The deformation unit 16 is still at least indirectly connected to the frame 4.

According to a preferred embodiment, the deformation unit 16 can comprise a vacuum unit 40. This vacuum unit 40 can be arranged opposite to an inside surface of the lateral wall 8. The vacuum unit 40 can be configured to generate a negative pressure acting contactless on the lateral wall 8 resulting in a deformation of the lateral wall 8 in a (negative) radial direction. Thus, the vacuum unit 40 can apply a suction force onto the lateral wall 8 at the first deformation section 30, such that the lateral wall 8 at the deformation section 30 is deformed in a negative radial direction. This deformation also results in the deformation at the second deformation section 31.

According to a further preferred embodiment of the invention, the device 2 comprises a hardening unit 60. The hardening unit 60 is configured for hardening the lacquer, preferably contactless. The hardening unit 60 can be formed by an UV-light unit. The hardening unit 60 is directly or indirectly connected to the frame 4. Moreover, the hardening unit 60 can be arranged within the interior space 36 formed by the transfer roller 6. For instance, if the hardening unit 60 is formed by an UV-light unit, the lateral wall 8 of the transfer roller 6 may be configured to transmit UV-light-waves. Thus, the lateral wall 8 can be transparent for UV-light. The hardening unit 60 can be arranged, such that UV-light is emitted towards a work surface 32 upon which the lateral wall 8 of the transfer roller 6 can roll. The lacquer may by hardenable via UV-light. Therefore, the device may be configured to control the drive unit 10 and/or the UV-light unit 60, such that lacquer transferred to the work surface 32 is immediately hardened via UV-light emitted by the UV-light unit 60.

As can be seen in FIG. 5, the slit nozzle 12 faces in a nozzle direction N with its muzzle end 14 such that the nuzzle direction N force an acute nozzle angle γ between 40 degree and 85 degree with a straight line (not shown) extending from a center of the first deformation section 30 to the muzzle end 14.

Referring again to FIG. 2, the slit nozzle 12 is schematically illustrated in a preferred embodiment, wherein the slit nozzle 12 comprises a first nozzle part 62 and a second nozzle part 64. Both nozzle parts 62, 64 are connected, in particular releasably connected, with each other. The first nozzle part 62 protrudes, preferably in the nozzle direction N, beyond the second nozzle part 64, such that the first nozzle part 62 is in direct contact with the outside contact surface 18 at the second deformation section 28 of the lateral wall 8 and such that the second nozzle part 64 is spaced apart from this outside contact surface 18. By the slit nozzle 12 preferably having at least two parts 62, 64, a contact pressure of the first nozzle part 62 on the outside contact surface 18 and/or the resulting deformation can be precisely adjusted by means of the first nozzle part 62. A lacquer channel 66 may be formed between the first nozzle part 62 and the second nozzle part 54. The lacquer to be applied to the outside contact surface 18 can be pushed/pressed through the nozzle channel 66 so that the lacquer emerges between the two front ends of the two nozzle parts 62, 64. The second nozzle part 64 can be formed and/or arranged such that a precise application of the lacquer is ensured.

Preferably, the first nozzle part 62 protrudes beyond the second nozzle part 64 in the nozzle direction N towards the outside contact surface 18 at the second deformation section 31 of the lateral wall 18. The resulting distance between the second nozzle part 64 and the outside contact surface 18 forms a thickness of an output channel end of the nozzle channel 66 and can therefore at least influence the thickness of the applied lacquer. As a result, a film thickness of the lacquer to be applied on the outside contact surface 18 can be precisely adjusted by means of the second nozzle part 64. This can be in particular the case, if the second nozzle part 64 is displaceable and/or adjustable with respect to the first nozzle part 62. This may be used to define the thickness of the lacquer film, in particular independent of the contact force and/or deformation resulting from the contact between the first nozzle part 62 and the outside contact surface 64.

However, according to a further preferred embodiment of the device, the slit nozzle 12 is arranged contactless to the second deformation section 31 of the lateral wall 8 and thus contactless to the outside contact surface 18 of the lateral wall 31.

Figure 6:
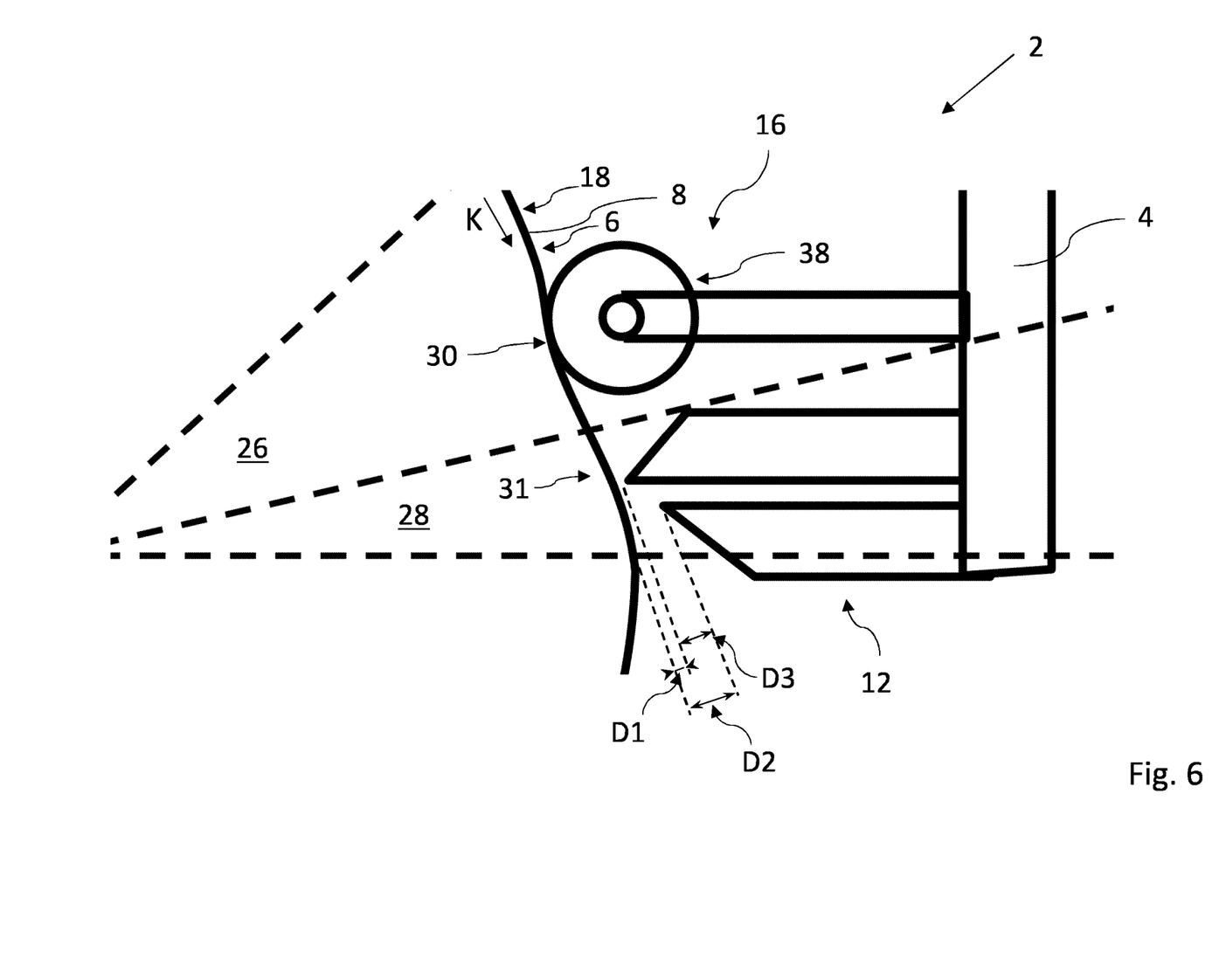
FIG. 6 illustrates an enlarged detail of an amended embodiment of the device illustrated in FIG. 2.

FIG. 6 exemplarily shows an enlarged detail of an amended embodiment of the device illustrated in FIG. 2. Therefore, the previous explanations, preferred features, effects and/or advantages may apply to the embodiment partly shown in FIG. 6 in an analogous manner. However, the embodiment of FIG. 6 differs from the embodiments explained in conjunction with each of FIGS. 2 and 5 in that the slit nozzle 12 is not in direct contact with the outside contact surface 18 of the lateral wall. Instead, the slit nozzle 12 is spaced from the outside contact surface 18.

Preferably, the muzzle end 14 of the slit nozzle 12 is arranged contactless to the outside contact surface 18 at the second deformation section 31 of the lateral wall 8, wherein the slit nozzle 12 is arranged such that a first minimum distance D1 between the muzzle end 14 facing the outside contact surface 18 at the second deformation section 31 of the lateral wall 8 and this outside contact surface 18 is less than 15 mm, in particular between 0.01 mm and 10 mm.

The slit nozzle 12 preferably comprises the first nozzle part 62 and the second nozzle part 64. Reference is made to the previous explanations in an analogous manner. However, it is to be noted that the first nozzle part is not in contact with the outside contact surface 18, but spaced with the first minimum distance D1 from the outside contact surface 18. The first minimum distance D1 is preferably the distance in the radial direction R between the outside contact surface 18 and the section of the first nozzle part 62 which is closest to the outside contact surface 18. The particular small distance according to the first minimum distance D1 ensures a particularly precise and evenly distributed application of the lacquer. At the same time a direct mechanical contact between the outside contact surface 18 of the lateral wall 8 and the first nozzle part 62 of the slit nozzle is avoided, which prevents wear of the lateral wall 8 of the transfer roller 6 and the slit nozzle 12.

Preferably, the second nozzle part 64 is spaced apart from the outside contact surface by a second minimum distance D2 between 0.01 mm and 5 mm, in particular between 1 mm and 3 mm. The second minimum distance D2 is preferably the distance in the radial direction R between the outside contact surface 18 and the section of the second nozzle part 66 which is closest to the outside contact surface 18. This second minimum distance D2 can define the thickness of the lacquer to be applied on the outside contact surface 18. As a further result, the second nozzle part 64 may be set back by a distance D3 with respect to the first nozzle part 62.

It is additionally pointed out that "comprising" does not rule out other elements, and "a" or "an" does not rule out a multiplicity. It is also pointed out that features that have been described with reference to one of the above exemplary embodiments may also be disclosed as in combination with other features of other exemplary embodiments described above. Reference signs in the claims are not to be regarded as restrictive.

The invention claimed is:

1. A device for a lacquer transfer, comprising:
a frame,
a transfer roller with a circumferential lateral wall,
a drive unit,
a slit nozzle with a muzzle end for dispensing lacquer, and
a deformation unit,
wherein the slit nozzle and the deformation unit are each at least indirectly connected to the frame,
wherein an outside contact surface of the lateral wall comprises several depressions,
wherein the transfer roller is mounted rotatably about an axis of rotation at the frame,
wherein the drive unit is configured to drive the transfer roller in a rotation direction K of the transfer roller, such that the lateral wall continuously passes through a first angular range fixed to the frame around the axis of rotation and subsequently through a second angular range fixed to the frame around the axis of rotation,
wherein the lateral wall of the transfer roller is elastically deformable in a radial direction R of the transfer roller,
wherein the deformation unit is configured to deform the lateral wall in the radial direction R of the transfer roller,
wherein the deformation unit is arranged, such that the deformation unit elastically deforms the lateral wall resulting in a respective first deformation section of the lateral wall passing through the first angular range and a respective second deformation section of the lateral wall passing through the second angular range,
wherein the muzzle end of the slit nozzle is arranged at the second deformation section of the lateral wall for dispensing lacquer into respective depressions, and
wherein the transfer roller is configured to roll with the outside contact surface on a work surface of a work piece for transferring the lacquer from the depressions to the work surface of the work piece.

2. The device according to claim 1, wherein the muzzle end of slit nozzle is in direct contact with the outside contact surface at the second deformation section of the lateral wall, the slit nozzle is arranged such that the lateral wall is deformed by the slit nozzle by less than 15 mm in radial direction R.

3. The device according to claim 1, wherein the slit nozzle comprises a first nozzle part and a second nozzle part, wherein the first nozzle part protrudes beyond the second nozzle part, such that the first nozzle part is in direct contact with the outside contact surface at the second deformation section of the lateral wall and such that the second nozzle part is spaced apart from this outside contact surface.

4. The device according to claim 1, wherein, the muzzle end of the slit nozzle is arranged contactless to the outside contact surface at the second deformation section of the lateral wall, the slit nozzle is arranged such that a first minimum distance between the muzzle end facing the outside contact surface at the second deformation section of the lateral wall and this outside contact surface is less than 15 mm.

5. The device according to claim 1, wherein the slit nozzle comprises a first nozzle part and a second nozzle part, wherein the first nozzle part protrudes beyond the second nozzle part in a direction towards the outside contact surface at the second deformation section of the lateral wall.

6. The device according to claim 3, wherein the second nozzle part is spaced apart from the outside contact surface by a second minimum distance between 0.01 mm and 5 mm.

7. The device according to claim 1, wherein the transfer roller is an inflated transfer roller.

8. The device according to claim 1, wherein the lateral wall is deformable by the deformation unit between 0.5 mm and 30 mm in radial direction R.

9. The device according to claim 1, wherein the deformation unit is arranged in the first angular range.

10. The device according to claim 1, wherein the deformation unit is arranged outside the transfer roller.

11. The device according to claim 1, wherein the deformation unit is arranged inside an interior space formed by the transfer roller.

12. The device according to claim 1, wherein the deformation unit comprises a pressure roller, which presses rollably on the lateral wall resulting in a deformation of the lateral wall in radial direction.

13. The device according to claim 1, wherein the deformation unit comprises a vacuum unit configured to generate negative pressure acting contactless on the lateral wall resulting in a deformation of the lateral wall in radial direction (R).

14. The device according to claim 1, wherein the deformation unit comprises a gas pressure unit configured to generate positive gas pressure acting contactless on the lateral wall resulting in a deformation of the lateral wall in radial direction (R).

15. The device according to claim 1, wherein ferromagnetic metal particles are embedded in the lateral wall, and wherein the deformation unit comprises a magnet causing a magnetic force on the metal particles resulting in a deformation of the lateral wall in radial direction (R).

16. The device according to claim 1, wherein a slit nozzle faces in a nozzle direction N with its muzzle end, such that the nozzle direction N forms an acute nozzle angle $\gamma$ between 40° and 85° with a straight line extending from a center of the first deformation section to the muzzle end.

17. The device according to claim 1, wherein the first and second angular ranges are of the same size.

18. The device according to claim 1, wherein the first angular range forms a first acute angle $\alpha$ between 5° and 40° at an tip end of the first angular range facing the axis of rotation of the transfer roller.

\* \* \* \* \*